United States Patent [19]

Banford et al.

[11] Patent Number: 5,785,748

[45] Date of Patent: Jul. 28, 1998

[54] TITANIUM DIOXIDE PIGMENTS

[75] Inventors: Jonathan Banford; Geoffrey Elliott Maud, both of Stockton-on-Tees, England; Maria Leonida Demosthenous, Calais, France

[73] Assignee: Tioxide Group Services Limited, United Kingdom

[21] Appl. No.: 672,199

[22] Filed: Jun. 27, 1996

[30] Foreign Application Priority Data

Jul. 13, 1995 [GB] United Kingdom ............... 9514388

[51] Int. Cl.⁶ .................... C09C 1/36; C09C 3/06
[52] U.S. Cl. .................. 106/443; 106/444; 428/403; 428/404
[58] Field of Search .................. 106/436, 443, 106/444, 445; 428/403, 404

[56] References Cited

U.S. PATENT DOCUMENTS

| 2,668,776 | 2/1954 | Miller ........................ 106/443 |
| 3,926,660 | 12/1975 | Holle et al. ................. 106/443 |
| 4,239,548 | 12/1980 | Barnard et al. .............. 106/436 |
| 4,310,440 | 1/1982 | Wilson et al. . |
| 5,114,486 | 5/1992 | Demosthenous et al. ...... 106/443 |
| 5,165,995 | 11/1992 | Losoi ........................ 106/443 |

FOREIGN PATENT DOCUMENTS

| 0 713 904 | 5/1996 | European Pat. Off. . |
| 52-109531 | 9/1977 | Japan . |
| 62-048775 | 3/1987 | Japan . |
| 1023590 | 3/1966 | United Kingdom . |
| 1029784 | 5/1966 | United Kingdom . |
| 1073338 | 6/1967 | United Kingdom . |
| 1266197 | 3/1972 | United Kingdom . |
| 1332677 | 10/1973 | United Kingdom . |
| 1419157 | 12/1975 | United Kingdom . |
| 1479296 | 7/1977 | United Kingdom . |
| 2042573 | 9/1980 | United Kingdom . |
| 2115394 | 9/1983 | United Kingdom . |
| 2 242 679 | 10/1991 | United Kingdom . |

OTHER PUBLICATIONS

"The Chemistry and Binding Properties of Aluminum Phosphates", J.H. Morros et al., Chem. Soc. Reviews, 1977b Voll. 6, pp. 173–194. (No Month).

"Study of the Phosphates of Aluminum and Trivalent Iron. I. The Neutral Orthophosphate of Aluminum", F. d'Yvoire, Memories Presente a la Societe Chemique No. 372 pp. 1762–11776. (Original and Translation) (Date Unknown).

*Primary Examiner*—Michael Marcheschi

[57] ABSTRACT

A method for the manufacture of a titanium dioxide pigment comprises mixing a suspension of titanium dioxide with a reagent formed by reacting concentrated phosphoric acid with aluminium or an aluminium compound at elevated temperature and adding an alkaline compound to the suspension until a pH value of at least 3.5 is achieved. A novel pigment which can be prepared by the method of the invention comprises titanium dioxide, the particles of which have a surface coating of aluminium phosphate in which the molar ratio of aluminium to phosphorus lies in the range 1.8:1 to 1:1.4 Al:P. The pigments prepared according to the invention are useful in the preparation of paper laminates.

24 Claims, No Drawings

TITANIUM DIOXIDE PIGMENTS

This invention relates to titanium dioxide pigments of improved light fastness and particularly to pigments for use in laminates.

Laminates consisting of multilayers of, for example, paper, impregnated with melamine-formaldehyde, phenol-formaldehyde or urea-formaldehyde resin and then compressed, are widely used in industry for purposes such as decorative panels, colouration being effected by incorporating pigments into the top layer or layers of paper.

Titanium dioxide is a pigment which is eminently suitable for this purpose. However, it is known that titanium dioxide, normally a white pigment, tends to develop a grey colouration when exposed to UV radiation (e.g. from sunlight) in the presence of the resin.

Various attempts have been made to solve this problem by coating the surface of the pigment as disclosed, inter alia, in GB Specifications Nos 1 023 590, 1 419 157, 1 479 296 and 2 042 573.

It is an object of this invention to provide a solution to the problem of grey colouration by coating particles of titanium dioxide with a coherent coating of aluminium phosphate.

According to one aspect of the invention, there is provided a process for the manufacture of a titanium dioxide pigment comprising mixing a suspension of titanium dioxide with a reagent formed by reacting concentrated phosphoric acid with aluminium or an aluminium compound at elevated temperature and adding an alkaline compound to the suspension until a pH value of at least 3.5 is achieved.

Surprisingly, the reagent formed by reacting concentrated phosphoric acid with aluminium or an aluminium compound forms a particularly coherent coating of aluminium phosphate on the pigment particles when precipitated according to the process of the invention.

Whilst the mechanism by which the coating precipitation occurs is not fully understood, it is believed that short —O—P—O—Al—O—P— chains are formed in solution during the reaction between the aluminium or aluminium compound and the phosphoric acid. When the pH is raised these short chains condense into longer chains and networks, (the excess phosphate being ejected) which have a high affinity for the pigment surface and cover it completely.

The reagent which is an essential feature of the invention can be formed from phosphoric acid and any aluminium compound which will react with and dissolve in the acid. Aluminium metal is suitable but not preferred due to the evolution of hydrogen. Preferred compounds include aluminium oxides, aluminium ores such as bauxite and aluminium hydroxide.

It is believed that the aluminium phosphate which is deposited as a coating on the particles of titanium dioxide is a form in which aluminium and phosphate radicals are present in approximately equimolar proportions.

According to a further aspect of the invention there is provided a titanium dioxide pigment the particles of which have a surface coating of aluminium phosphate in which the molar ratio of aluminium to phosphorus lies in the range 1.8:1 to 1:1.4 Al:P.

The aluminium or aluminium compound is normally reacted with an excess of phosphoric acid. Preferably, the proportions of aluminium or aluminium compound and phosphoric acid are such that the molar ratio of aluminium to phosphorus is in the range 1:2 to 1:5 Al:P.

The aluminium or aluminium compound is reacted with phosphoric acid at elevated temperature, which is understood to be a temperature above normal ambient temperature. Conveniently, the reaction temperature is in the range 30° C. to 100° C. and preferably in the range 50° C. to 70° C.

After mixing the suspension of titanium dioxide with the aluminium phosphate reagent the pH of the mixture so formed is adjusted to a value of at least 3.5 by the addition of an alkaline compound. Generally, any alkaline compound is suitable but preferred compounds include potassium hydroxide, ammonium hydroxide, sodium hydroxide and aluminate salts of alkali metals.

The pH is adjusted to a value of at least 3.5 but, preferably, it is adjusted to a value of at least 5.

The amount of aluminium phosphate which is precipitated on to the particles of titanium dioxide is sufficient to form a coherent and impervious coating on the particles. Normally an amount of aluminium equivalent to from 2 per cent to 6 per cent by weight calculated as $Al_2O_3$ with respect to $TiO_2$ is precipitated. Preferably, the amount of aluminium is from 3.5 per cent to 4.5 per cent by weight calculated as $Al_2O_3$ with respect to $TiO_2$. The amount of phosphorus in the coating is normally from 2 per cent to 12 per cent by weight calculated as $P_2O_5$ with respect to $TiO_2$, preferably from 3 per cent to 10 per cent by weight calculated as $P_2O_5$ with respect to $TiO_2$ and, more preferably, from 5 per cent to 6.5 per cent by weight calculated as $P_2O_5$ with respect to $TiO_2$.

According to one preferred process of the invention, there is provided a process for the manufacture of a titanium dioxide pigment comprising the steps of (a) reacting aluminium hydroxide with concentrated phosphoric acid in a molar ratio of aluminium to phosphorus of 1:2 to 1:5 Al:P at a temperature of from 50° C. to 70° C., (b) maintaining the reaction mixture at this temperature until a clear solution is obtained, (c) diluting the resulting clear solution, (d) adding an amount of the diluted solution to a dispersion of milled titanium dioxide so as to give a mixture containing from 2 per cent to 6 per cent by weight of aluminium phosphate reagent calculated as $Al_2O_3$ based on the weight of dry titanium dioxide, (e) adding sodium hydroxide over a time interval until the resulting mixture has a pH value of at least 5, and (f) filtering off the resulting coated pigment.

The phosphoric acid used to form the reagent preferably has a concentration of at least 50 per cent by weight calculated as $H_3PO_4$ and most preferably the concentration is from 70 to 80 per cent by weight calculated as $H_3PO_4$. It is convenient to use the concentration normally available commercially of 85 per cent by weight but, preferably, this is diluted slightly with water to a concentration of 70 per cent to 80 per cent by weight calculated as $H_3PO_4$.

After formation, the reagent generally has a relatively high viscosity and, for ease of handling, it is preferably diluted to a concentration equivalent to between 90 and 120 grams $Al_2O_3$ per liter before it is mixed with the suspension of titanium dioxide.

The suspension of titanium dioxide is prepared in any convenient manner. The reactor discharge from a "chloride" process pigment plant or the calciner discharge from a "sulphate" process pigment plant can be mixed with water to form the suspension. Preferably, however, as is conventional in the titanium dioxide industry, the titanium dioxide is milled to reduce aggregation and improve the degree of dispersion. One form of mill frequently used in the titanium dioxide pigment industry is known as a sand mill in which an aqueous suspension of the titanium dioxide is stirred rapidly in the presence of a grinding agent such as sand. The "overflow" from a sand mill comprises an excellent suspension of titanium dioxide for use in this invention, after adjustment if necessary, to an appropriate concentration.

The suspension of titanium dioxide can be formed from water, and titanium dioxide alone but, preferably, a dispersing agent is present. The dispersing agent is typically a phosphate such as sodium hexametaphosphate, a silicate such as sodium silicate or an organic compound such as an alkanolamine. Monoisopropanolamine is a particularly preferred dispersing agent.

The concentration of the suspension of titanium dioxide used in the process of the invention is usually between 200 and 400 grams $TiO_2$ per liter and preferably between 230 and 270 grams $TiO_2$ per liter.

After the reagent is added to the suspension of titanium dioxide, aluminium phosphate is deposited by adding an alkaline compound to the resulting mixture. One preferred alkaline compound is sodium hydroxide and this is preferably added as a solution and at a concentration in the range 200 to 250 grams per liter.

In an alternative process a solution of an alkali metal aluminate, for example caustic sodium aluminate, is used as the alkaline compound. Preferably, the concentration of caustic sodium aluminate will be equivalent to from 50 to 120 grams $Al_2O_3$ per liter. As mentioned above, the aluminium phosphate reagent is normally prepared with an excess of phosphoric acid. When an alkali metal aluminate is used as the alkaline compound this excess phosphate is converted into aluminium phosphate during the precipitation. Normally, however, an aluminium phosphate reagent containing a relatively high proportion of phosphate will be used when the alkaline compound is an alkali metal aluminate.

The coated titanium dioxide is separated from the resulting mixture by, for example, filtration and subsequently dried.

It has been shown that the lightfastness of a titanium dioxide pigment coated according to the process of the invention can be improved by blending a compound which is believed to act as an oxidizing agent with the coated pigment before it is dried. Compounds which are suitable for improving lightfastness include potassium iodate and copper sulphate but the preferred compound is potassium nitrate.

Therefore, in a preferred method of the invention, potassium nitrate in an amount of from 0.5 per cent to 1.0 per cent by weight based on the weight of dry titanium dioxide, is added before or after the filtration step.

Examination of the pigments coated according to the process of the invention by electron microscopy has disclosed that the coating of aluminium phosphate is smooth and coherent. The lightfastness of the coated pigments is good.

The invention will be more readily understood from the following examples.

EXAMPLE 1

Coating reagent was prepared by first adding 10.5 liters of demineralised water to 50 liters of 85% phosphoric acid and then adjusting the temperature of the resulting mixture to 32°–38° C. 16.7 kg aluminium hydroxide was added and the mixture agitated until the exothermic reaction had ceased. The temperature was then adjusted to 70° C. and maintained until a clear solution was obtained which was diluted to 104 liters with demineralised water.

200 kg of rutile titanium dioxide particles manufactured by the sulphate process were sand milled using 0.4% by weight monoisopropanolamine (MIPA) as dispersant and then diluted with demineralised water to form a dispersion containing 250 g per liter titanium dioxide.

The dispersion was heated to 50°–60° C. and the coating reagent added over a period of 15 minutes. After a further 15 minutes a solution containing 220 g per liter sodium hydroxide was added slowly over a period of 30 minutes until a pH of 5 was reached (i.e. an amount equivalent to 0.75 liters per liter of reagent). The resulting dispersion was filtered and the filter cake washed with warm demineralised water, dried and milled in a fluid energy mill.

Analysis showed that the titanium dioxide carried a coating having an aluminium to phosphorus ratio of 1:1.05 Al:P in a quantity equivalent to 3.95% $Al_2O_3$ with respect to $TiO_2$.

EXAMPLE 2

Example 1 was repeated except that 0.75% by weight (based on the dry weight of titanium dioxide) of potassium nitrate added as an approximately 10 wt % solution was mixed into the washed filter cake.

EXAMPLE 3

Samples of the products from Examples 1 and 2 and samples of coated titanium dioxide pigments available commercially as TIOXIDE TR44 (from Tioxide Group Limited) and TIOFINE R820 (from Kemira) were incorporated into paper, the amount incorporated being calculated to produce 30±1% ash. The resulting papers were impregnated with an aqueous solution of BEETLE BL434 melamine-formaldehyde resin, dried and pre-cured.

Laminate test samples were prepared for light fastness and colour measurement by pressing together in conventional manner a double layer of pigment-containing paper and five kraft core papers. Samples for opacity and contrast measurement were prepared in a similar way except that half the area of the surface was formed by a single layer of pigment-containing paper.

Exposure was carried out with the samples half masked in a XENOTEST 1200LM accelerated weathering machine for 96 hours at 80% power, 50° C. and 30% humidity (i.e. an exposure sufficient to fade the Blue Wool Standard No 6 to Grey Scale No 4).

Measurements were carried out using a Pacific Scientific Colorguard System 05 colorimeter.

The results of the tests are shown in Table I in which:

Retention is the percentage of the original pigment added which is retained in the paper;

CR is the ratio of the percentage of the light reflected from the single layer thickness to the light reflected from the double layer thickness and is thus a measure of the opacity of the pigment-impregnated paper;

L*, a* and b* are the values for brightness, red/green hue and yellow/blue hue respectively according to the modified CIE system (CIELAB);

$$\underline{W} = 100 - \sqrt{[(100 - L^*)^2 + 10 b^{*2}]}$$

and is a measure of the initial appearance;

$$\underline{\Delta E} = \sqrt{\Delta L^{*2} + \Delta a^{*2} + \Delta b^{*2}}$$

and is a measure of the change in appearance;

BWS is the value of the exposed sample on the Society of Dyers and Colourists Blue Wool Scale

TABLE I

|  | Example 1 | Example 2 | TR44 | R820 |
|---|---|---|---|---|
| Ash (%) | 29.00 | 30.50 | 29.00 | 30.30 |
| Retention (%) | 60.00 | 64.50 | 68.10 | 62.10 |
| CR | 96.10 | 95.50 | 95.90 | 95.60 |
| L* unexposed | 93.20 | 94.00 | 93.80 | 94.60 |
| a* unexposed | −1.00 | −0.90 | −0.90 | −1.00 |
| b* unexposed | 4.00 | 3.80 | 4.10 | 3.50 |
| W | 85.70 | 86.60 | 85.80 | 87.70 |
| L* exposed | 92.50 | 93.50 | 93.30 | 94.30 |
| a* exposed | −1.20 | −1.10 | −1.00 | −1.20 |
| b* exposed | 3.30 | 3.00 | 3.10 | 2.60 |
| ΔE | 0.96 | 0.89 | 1.10 | 0.96 |
| BWS | 5–6 | 6–7 | 5–6 | 6–7 |

TABLE II

|  | Example 4 | Example 5 | TR44 | R820 |
|---|---|---|---|---|
| Ash (%) | 31.00 | 30.50 | 31.50 | 32.60 |
| Retention (%) | 51.10 | 50.00 | 57.50 | 55.00 |
| CR | 95.40 | 95.60 | 94.40 | 95.10 |
| L* unexposed | 94.24 | 94.50 | 94.80 | 95.65 |
| a* unexposed | −0.83 | −0.72 | −0.91 | −1.03 |
| b* unexposed | 2.85 | 2.82 | 3.11 | 2.39 |
| W | 89.30 | 89.50 | 88.90 | 91.30 |
| L* exposed | 93.80 | 94.40 | 94.85 | 95.76 |
| a* exposed | −0.58 | −0.54 | −0.74 | −0.75 |
| b* exposed | 2.16 | 2.15 | 2.05 | 1.43 |
| ΔE | 0.86 | 0.70 | 1.07 | 1.01 |
| BWS | 6 | 6 | 6 | 7 |

EXAMPLE 4

Coating reagent was prepared by adding 20 grams of commercial aluminium foil to 160 milliliters of 85% phosphoric acid, waiting until the spontaneous effervescence had died down and the foil had completely dissolved, and diluting with 250 milliliters of demineralised water.

2000 grams of rutile titanium dioxide particles manufactured by the sulphate process were sand milled using 0.4% by weight monoisopropanolamine (MIPA) as dispersant and then diluted with demineralised water to form a dispersion containing 250 g per liter titanium dioxide, half of which, containing 1000 grams of titanium dioxide, was used in this example.

The dispersion was heated to 50°–60° C. and the above-mentioned coating reagent added over a period of 15 minutes. After a further 15 minutes, a solution containing 110 g per liter sodium hydroxide was added slowly over a period of 30 minutes until a pH of 5 was reached. The resulting dispersion was filtered and the filter cake washed with warm demineralised water, dried and milled in a fluid energy mill.

Analysis showed that the titanium dioxide carried a coating having an aluminium to phosphorus ratio of 1:1.12 Al:P in a quantity equivalent to 3.8% $Al_2O_3$ with respect to $TiO_2$.

EXAMPLE 5

Example 4 was repeated except that 0.75% by weight (based on the dry weight of titanium dioxide) of potassium nitrate in aqueous solution was mixed into the washed filter cake.

EXAMPLE 6

Samples of the products from Examples 4 and 5 and control samples of coated titanium dioxide pigments available commercially as TIOXIDE TR44 (from Tioxide Group Limited) and TIOFINE R820 (from Kemira) were incorporated into paper and were tested in paper laminates in an identical manner to Example 3. The ash content of the papers produced with the control samples were found to be slightly outside the target range of 30±1% but this is not believed to have a significant effect on the results. The results of the tests are shown in Table II:

EXAMPLE 7

Coating reagent was prepared by slurrying 80 grams of aluminium hydroxide in 25 ml of demineralised water, and then adding 112 ml of 85% phosphoric acid. The slurry was warmed with stirring until a definite exothermic reaction began. Once the reaction had ceased, the temperature was maintained at 90° C. for 30 minutes. The resulting paste was let down with 200 ml of 50% phosphoric acid, followed by dilution to 500 ml with demineralised water.

2000 grams of rutile titanium dioxide particles manufactured by the sulphate process were sand milled using 0.4% by weight monoisopropanolamine (MIPA) as dispersant and then diluted with demineralised water to form a dispersion containing 250 g per liter titanium dioxide, half of which, containing 1000 grams of titanium dioxide, was used in this example.

The dispersion was heated to 50°–60° C. and 370 ml of the coating reagent added over a period of 15 minutes. After a further 15 minutes, a solution containing 220 g per liter sodium hydroxide was added slowly over a period of 30 minutes until a pH of 5 was reached (i.e. an amount approximately equivalent to 0.5 liters per liter of reagent). The resulting dispersion was filtered and the filter cake washed with warm demineralised water. 0.75% by weight (based on the dry weight of titanium dioxide) of potassium nitrate in aqueous solution was mixed into the washed filter cake, which was dried and milled in a fluid energy mill.

Analysis showed that the titanium dioxide carried a coating having an aluminium to phosphorus ratio of 1:1.16 Al:P in a quantity equivalent to 2.9% $Al_2O_3$ with respect to $TiO_2$.

EXAMPLE 8

2000 grams of rutile titanium dioxide particles manufactured by the sulphate process were sand milled using 0.4% by weight monoisopropanolamine (MIPA) as dispersant and then diluted with demineralised water to form a dispersion containing 250 g per liter titanium dioxide, half of which, containing 1000 grams of titanium dioxide, was used in this example.

The dispersion was heated to 50°–60° C. and 494 ml of the coating reagent used in Example 7 was added over a period of 15 minutes. After a further 15 minutes, a solution containing 220 g per liter sodium hydroxide was added slowly over a period of 30 minutes until a pH of 5.1 was reached (i.e. an amount approximately equivalent to 0.5 liters per liter of reagent). The resulting dispersion was filtered and the filter cake washed with warm demineralised water. 0.75% by weight (based on the dry weight of titanium dioxide) of potassium nitrate in aqueous solution was mixed into the washed filter cake, which was dried and milled in a fluid energy mill.

Analysis showed that the titanium dioxide carried a coating having an aluminium to phosphorus ratio of 1:1.15 Al:P in a quantity equivalent to 3.8% $Al_2O_3$ with respect to $TiO_2$.

EXAMPLE 9

2000 grams of rutile titanium dioxide particles manufactured by the sulphate process were sand milled using 0.4% by weight monoisopropanolamine (MIPA) as dispersant and then diluted with demineralised water to form a dispersion containing 250 g per liter titanium dioxide, half of which, containing 1000 grams of titanium dioxide, was used in this example.

The dispersion was heated to 50°–60° C. and 617 ml of the coating reagent used in Example 7 was added over a period of 15 minutes. After a further 15 minutes, a solution containing 220 g per liter sodium hydroxide was added slowly over a period of 30 minutes until a pH of 5.1 was reached (i.e. an amount approximately equivalent to 0.5 liters per liter of reagent). The resulting dispersion was filtered and the filter cake washed with warm demineralised water. 0.75% by weight (based on the dry weight of titanium dioxide) of potassium nitrate in aqueous solution was mixed into the washed filter cake, which was dried and milled in a fluid energy mill.

Analysis showed that the titanium dioxide carried a coating having an aluminium to phosphorus ratio of 1:1.10 Al:P in a quantity equivalent to 4.6% $Al_2O_3$ with respect to $TiO_2$.

EXAMPLE 10

Samples of the products from Examples 7, 8 and 9 and samples of coated titanium dioxide pigments available commercially as TIOXIDE TR44 (from Tioxide Group Limited) and TIOFINE R820 (from Kemira) were incorporated into paper and were tested in paper laminates in an identical manner to Example 3. The results of the tests are shown in Table III:

TABLE III

| | Example 7 | Example 8 | Example 9 | TR44 | R820 |
|---|---|---|---|---|---|
| Ash (%) | 29.10 | 29.00 | 28.60 | 30.30 | 29.10 |
| Retention (%) | 44.60 | 44.40 | 41.70 | 63.90 | 48.90 |
| CR | 95.00 | 94.90 | 93.60 | 94.40 | 94.50 |
| L* unexposed | 94.57 | 94.73 | 94.88 | 94.67 | 95.23 |
| a* unexposed | −0.92 | −0.90 | −1.05 | −1.02 | −1.12 |
| b* unexposed | 3.19 | 3.13 | 3.23 | 3.40 | 2.93 |
| W | 88.50 | 88.80 | 88.60 | 88.00 | 89.60 |
| L* exposed | 93.96 | 93.91 | 93.94 | 93.97 | 94.58 |
| a* exposed | −0.70 | −0.70 | −0.77 | −0.75 | −0.94 |
| b* exposed | 2.35 | 2.16 | 2.34 | 2.26 | 1.58 |
| ΔE | 1.06 | 1.29 | 1.32 | 1.36 | 1.51 |
| BWS | 6–7 | 7 | 5 | 6–7 | 7 |

EXAMPLE 11

2000 grams of rutile titanium dioxide particles manufactured by the sulphate process were sand milled using 0.4% by weight monoisopropanolamine (MIPA) as dispersant and then diluted with demineralised water to form a dispersion containing 250 g per liter titanium dioxide, half of which, containing 1000 grams of titanium dioxide, was used in this example.

The dispersion was heated to 50°–60° C. and 494 ml of coating reagent made as in Example 7 was added over a period of 15 minutes. After a further 15 minutes, a solution containing 220 g per liter sodium hydroxide was added slowly over a period of 30 minutes until a pH of 5.0 was reached (i.e. an amount approximately equivalent to 0.5 liters per liter of reagent). The resulting dispersion was filtered and the filter cake washed with warm demineralised water. The cake was split in half, and to one half was added 0.75% by weight (based on the dry weight of titanium dioxide) of sodium nitrate in aqueous solution. The treated filter cake was dried and milled in a fluid energy mill.

Analysis showed that the titanium dioxide carried a coating having an aluminium to phosphorus ratio of 1:1.14 Al:P in a quantity equivalent to 4.2% $Al_2O_3$ with respect to $TiO_2$.

EXAMPLE 12

The half of the filter cake from the previous example not treated with sodium nitrate was treated with 0.75% potassium nitrate in aqueous solution, and was then dried and fluid energy milled in the same manner.

EXAMPLE 13

Samples of the products from Examples 11 and 12 and control samples of coated titanium dioxide pigments available commercially as TIOXIDE TR44 (from Tioxide Group Limited) and TIOFINE R820 (from Kemira) were incorporated into paper and were tested in paper laminates in an identical manner to Example 3. As in Example 6, the ash contents for the papers containing control samples were found to be outside the target range of 30±1% The results of the tests are shown in Table IV:

TABLE IV

| | Example 11 | Example 12 | TR44 | R820 |
|---|---|---|---|---|
| Ash (%) | 29.70 | 31.80 | 31.50 | 32.60 |
| Retention (%) | 48.00 | 53.00 | 57.50 | 55.00 |
| CR | 94.80 | 95.60 | 94.40 | 95.10 |
| L* unexposed | 93.63 | 93.88 | 94.80 | 95.65 |
| a* unexposed | −0.76 | −0.73 | −0.91 | −1.03 |
| b* unexposed | 2.76 | 2.57 | 3.11 | 2.39 |
| W | 89.20 | 89.80 | 88.90 | 91.30 |
| L* exposed | 93.61 | 93.56 | 94.85 | 95.76 |
| a* exposed | −0.63 | −0.64 | −0.74 | −0.75 |
| b* exposed | 1.78 | 1.64 | 2.05 | 1.43 |
| ΔE | 0.99 | 0.99 | 1.07 | 1.01 |
| BWS | 7 | 7 | 6 | 7 |

EXAMPLE 14

Coating reagents were prepared by making up four samples of phosphoric acid of varying concentrations. In the first, 56 ml of 85% phosphoric acid was mixed with 6 ml of demineralised water, in the second, 56 ml of 85% phosphoric acid was mixed with 14 ml of demineralised water, in the third, 56 ml of 85% phosphoric acid was mixed with 24 ml of demineralised water and in the fourth, 56 ml of 85% phosphoric acid was mixed with 37 ml of demineralised water. This gave a series of diluted phosphoric acid samples with the compositions by volume 9:1, 8:2, 7:3 and 6:4 85% phosphoric acid:water. To each sample was added 40 grams of aluminium hydroxide. The slurries were warmed with stirring until a definite exothermic reaction began. All four samples produced a paste which could be diluted with 25% by weight phosphoric acid to give a clear solution suitable for coating titanium dioxide in accordance with the invention.

EXAMPLES 15-18

Coating reagent was prepared by dissolving with warming and stirring 160 g aluminium hydroxide in a mixture of 224 ml 85% phosphoric acid and 81 ml demineralised water. After the exothermic reaction had ceased the resulting paste was diluted with 200 ml 25% by weight phosphoric acid followed by 1000 ml demineralised water to give a clear solution containing the equivalent of 120 g $Al_2O_3$ per liter.

2000 grams of rutile titanium dioxide particles manufactured by the sulphate process were sand milled using 0.4% by weight monoisopropanolamine (MIPA) as dispersant and then diluted with demineralised water to form a dispersion containing 250 g per liter titanium dioxide.

This dispersion was split into two, each half containing 1000 grams of titanium dioxide. Each half was heated to 50°–60° C. and 250 ml of coating reagent was added over a period of 30 minutes, while a solution containing 222 g per liter of sodium hydroxide was added simultaneously, to keep the solution at a pH value between 4.7 and 5.3 (approximately 140 ml was required). After a further 15 minutes, 115 ml of a solution of aluminium sulphate containing the equivalent of 87 g per liter of $Al_2O_3$ was added over a period of 15 minutes, while a solution containing 222 g per liter of sodium hydroxide was added simultaneously, to keep the solution at a pH value between 5.2 and 5.8. The two slurries were then combined prior to filtration. The filter cake was washed with warm demineralised water, and was then split into four equal parts. The first of these was dried and milled in a fluid energy mill without further treatment (Example 15). To the second was added 0.5% by weight potassium nitrate as an aqueous solution (Example 16), to the third was added 1.0% potassium nitrate as an aqueous solution (Example 17), and to the fourth was added 1.5% potassium nitrate as an aqueous solution (Example 18). Each cake was dried and milled in a fluid energy mill.

Analysis showed that in each case the titanium dioxide carried a coating having an aluminium to phosphorus ratio of 1:1.00 Al:P in a quantity equivalent to 3.8% $Al_2O_3$ with respect to $TiO_2$.

EXAMPLE 19

Samples of the products from Examples 15–18 and samples of coated titanium dioxide pigments available commercially as TIOXIDE TR44 (from Tioxide Group Limited) and TIOFINE R820 (from Kemira) were incorporated into paper and were tested in paper laminates in an identical manner to Example 3. The results of the tests are shown in Table V:

TABLE V

|  | Example 15 | Example 16 | Example 17 | Example 18 | TR44 | R820 |
| --- | --- | --- | --- | --- | --- | --- |
| Ash (%) | 31.00 | 29.70 | 31.00 | 30.00 | 30.40 | 30.40 |
| Retention (%) | 62.40 | 58.70 | 62.40 | 59.50 | 66.20 | 56.00 |
| CR | 94.70 | 93.90 | 93.10 | 94.40 | 94.80 | 94.20 |
| L* unexposed | 95.10 | 94.59 | 94.73 | 94.82 | 94.86 | 95.43 |

TABLE V-continued

|  | Example 15 | Example 16 | Example 17 | Example 18 | TR44 | R820 |
| --- | --- | --- | --- | --- | --- | --- |
| a* unexposed | −1.18 | −1.17 | −1.18 | −1.17 | −1.05 | −1.14 |
| b* unexposed | 3.24 | 3.15 | 3.10 | 3.10 | 3.24 | 2.61 |
| W | 88.64 | 88.66 | 88.87 | 88.91 | 88.54 | 90.57 |
| L* exposed | 93.49 | 93.46 | 93.25 | 93.31 | 94.50 | 94.88 |
| a* exposed | −0.88 | −0.87 | −0.91 | −0.95 | −0.78 | −1.00 |
| b* exposed | 2.17 | 1.93 | 2.16 | 2.16 | 2.04 | 1.55 |
| ΔE | 1.96 | 1.69 | 1.77 | 1.79 | 1.28 | 1.20 |
| BWS | 5 | 5–6 | 6 | 6 | 6–7 | 7 |

EXAMPLE 20

Coating reagent was prepared by slurrying 80 grams of aluminium hydroxide in 25 ml of demineralised water, and then adding 106 ml of 85% phosphoric acid. The slurry was warmed with stirring until a definite exothermic reaction began. Once the reaction had ceased, the temperature was maintained at 90° C. for 30 minutes. The resulting paste was let down with 200 ml of diluted phosphoric acid prepared by mixing equal weights of phosphoric acid and water, followed by dilution to 500 ml with demineralised water. The resulting reagent contained aluminium and phosphorus in the ratio of 1:2.97 Al:P by weight.

A dispersion containing 1000 grams of rutile titanium dioxide particles was prepared by diluting a slurry obtained from the sand mill of a chloride process titanium dioxide plant to 180 g per liter titanium dioxide.

The dispersion was heated to 50°–60° C. and 152 ml of the coating reagent added over a period of 15 minutes. After a further 15 minutes, a solution of alkaline sodium aluminate containing the equivalent of 2.4 per cent $Al_2O_3$ by weight with respect to $TiO_2$ was added slowly over a period of 30 minutes. When a pH of 5 was reached hydrochloric acid was added simultaneously at a rate which maintained the pH in the range 5.0 to 5.5. When all the sodium aluminate had been added the resulting dispersion was stirred for a further 20 minutes and filtered and the filter cake washed with warm demineralised water. 0.75% by weight (based on the dry weight of titanium dioxide) of potassium nitrate in aqueous solution was mixed into the washed filter cake, which was dried and milled in a fluid energy mill.

Analysis showed that the titanium dioxide carried a coating having an aluminium to phosphorus ratio of 1:1.15 in a quantity equivalent to 4.0% $Al_2O_3$ with respect to $TiO_2$.

A sample of this product and samples of coated titanium dioxide pigments available commercially as TIOXIDE TR44 (from Tioxide Group Limited) and TIOFINE R820 (from Kemira) were incorporated into paper and were tested in paper laminates in a manner similar to that used in Example 3. The following results were obtained.

|  | Example 20 | TR44 | R820 |
| --- | --- | --- | --- |
| ΔE | 1.3 | 1.6 | 1.5 |
| BWS | 7–8 | 7 | 7 |

We claim:

1. A process for the manufacture of a coated titanium dioxide pigment comprising (a) forming a suspension of titanium dioxide, (b) mixing said suspension with a reagent formed by reacting concentrated phosphoric acid with a source of aluminium selected from the group consisting of aluminium and aluminium compounds at elevated temperature and (c) adding an alkaline compound to the suspension until a pH value of at least 3.5 is achieved.

2. A process according to claim 1 in which the reagent is formed by reacting concentrated phosphoric acid with a source of aluminium selected from the group consisting of aluminium oxides, and aluminium hydroxides.

3. A process according to claim 1 in which the reagent is formed by reacting concentrated phosphoric acid with the source of aluminium in amounts which provide a molar ratio of aluminium to phosphorus of between 1:2 to 1:5 Al:P.

4. A process according to claim 1 in which the concentrated phosphoric acid is reacted with the source of aluminium at a temperature of between 30° C. to 100° C.

5. A process according to claim 1 in which the reagent is used in an amount sufficient to form a coating on the titanium dioxide particles, said coating contains aluminium, calculated as $Al_2O_3$, in an amount of between 2 per cent to 6 per cent by weight with respect to $TiO_2$.

6. A process according to claim 1 in which the reagent is used in an amount sufficient to form a coating on the titanium dioxide particles, said coating contains phosphorus, calculated as $P_2O_5$, in an amount of between 2 per cent to 12 per cent by weight with respect to $TiO_2$.

7. A process according to claim 1 in which the concentrated phosphoric acid contains between 70 per cent and 80 per cent acid by weight calculated as $H_3PO_4$.

8. A process according to claim 1 in which the reagent is diluted to a concentration equivalent to between 90 and 120 grams $Al_2O_3$ per liter before it is mixed with the suspension of titanium dioxide.

9. A process according to claim 1 in which the suspension of titanium dioxide contains between 200 and 400 grams $TiO_2$ per liter.

10. A process according to claim 1 in which the titanium dioxide is subjected to a milling step before mixing with the reagent.

11. A process according to claim 1 in which a dispersing agent is present in the suspension of titanium dioxide.

12. A process according to claim 11 in which the dispersing agent is monoisopropanolamine.

13. A process according to claim 1 in which the alkaline compound is a solution of sodium hydroxide having a concentration of between 200 to 250 grams per liter.

14. A process according to claim 1 in which the alkaline compound is caustic sodium aluminate in aqueous solution having a concentration, calculated as $Al_2O_3$ of between 50 to 120 grams per liter.

15. A process for the manufacture of a coated titanium dioxide pigment comprising the steps of (a) reacting aluminium hydroxide with concentrated phosphoric acid in a molar ratio of aluminium to phosphorus of between 1:2 to 1:5 Al:P at a temperature of from 50° C. to 70° C., (b) maintaining the reaction mixture at this temperature until a clear solution is obtained, (c) diluting the clear solution, (d) adding an amount of the diluted solution to a dispersion of milled titanium dioxide so as to produce a mixture containing from 2 per cent to 6 per cent by weight of aluminium phosphate reagent, calculated as $Al_2O_3$, based on the weight of dry titanium dioxide, (e) adding sodium hydroxide over a time interval until the resulting mixture has a pH value of at least 5, and (f) filtering off the coated pigment.

16. The process according to claim 1, further comprising the steps of (d) blending an oxidizing agent with the coated pigment and (e) drying the coated pigment.

17. The process according to claim 15, further comprising the steps of blending an oxidizing agent with the coated pigment before or after step (f) and drying the coated pigment.

18. A process according to claim 16 in which the oxidizing agent is potassium nitrate and is used in an amount of from 0.5 per cent to 1.0 per cent by weight based on dry weight of titanium dioxide.

19. A process according to claim 17 in which the oxidizing agent is potassium nitrate and is used in an amount of from 0.5 per cent to 1.0 per cent by weight based on dry weight of titanium dioxide.

20. A titanium dioxide pigment having a surface coating of aluminium phosphate in which phosphorus is present in a molar excess over aluminium and in which the coating has a molar ratio of phosphorus to aluminium of up to 1.4:1 P:Al, said pigment having present an oxidizing agent in an amount effective to improve lightfastness of the pigment.

21. A titanium dioxide pigment according to claim 20 in which aluminium phosphate is present in an amount, calculated as $Al_2O_3$, of between 2 per cent to 6 per cent by weight with respect to $TiO_2$.

22. A titanium dioxide pigment according to claim 20 in which the aluminium phosphate is present in an amount, calculated as $P_2O_5$, of between 2 per cent to 12 per cent by weight with respect to $TiO_2$.

23. A titanium dioxide pigment according to claim 20 wherein the oxidizing agent is potassium nitrate.

24. A titanium dioxide pigment according to claim 20 wherein the oxidizing agent is present in an amount from between 0.5 per cent to 1.0 per cent based on dry weight of titanium dioxide.

* * * * *